United States Patent
Mozdzer et al.

(10) Patent No.: US 6,307,571 B2
(45) Date of Patent: *Oct. 23, 2001

(54) CUSTOMIZABLE USER INTERFACE FOR A MAILING APPARATUS

(75) Inventors: Joseph M. Mozdzer, Beacon Falls; Robert G. Arsenault, Stratford; Gary S. Jacobson, Norwalk; Wesley A. Kirschner, Hamden; Daniel Lanin, West Hartford; Sharon A. McNeal, Monroe, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/808,505

(22) Filed: Mar. 15, 2001

Related U.S. Application Data

(63) Continuation of application No. 09/364,080, filed on Jul. 30, 1999, now Pat. No. 6,266,055.

(51) Int. Cl.$^7$ ........................................ G06F 3/00
(52) U.S. Cl. ................ 345/762; 345/764; 345/835; 345/853; 345/467; 705/401; 705/410
(58) Field of Search ................ 345/348, 358, 345/333, 334, 339, 970, 965, 357, 156, 168, 172; 705/401, 410, 411

(56) References Cited

U.S. PATENT DOCUMENTS

| | | | |
|---|---|---|---|
| 5,437,010 | * 7/1995 | Blackman et al. | 395/161 |
| 5,611,059 | * 3/1997 | Benton et al. | 345/326 |
| 5,675,753 | * 10/1997 | Hansen et al. | 345/333 |
| 5,726,883 | * 3/1998 | Levine et al. | 345/335 |
| 5,831,611 | * 11/1998 | Kennedy et al. | 345/335 |
| 6,032,122 | * 2/2000 | Gertner et al. | 705/8 |
| 6,097,386 | * 8/2000 | Bardon et al. | 345/333 |

* cited by examiner

Primary Examiner—Raymond J. Bayerl
Assistant Examiner—Cuong T. Thai
(74) Attorney, Agent, or Firm—Angelo N. Chaclas; Michael E. Melton

(57) ABSTRACT

A customizable user interface for a mailing apparatus, such as a postage meter or other mailing equipment, provided as input data to a user interface control program, the input data specifying all aspects of the look and feel of the user interface. The invention provides a specific organization of the input data suitable for providing the required specifications. At a high level, the data is organized into a screen tree component, for providing the feel of each screen, i.e. the response by the mailing apparatus (usually the execution of a function) to any key pressed by a user in association with each screen of the user information as well as for providing what screens to display in response to an event so as to communicate the occurrence of the event to a user; and a screen language component, used in conjunction with a font component, for providing the look of each screen, i.e. for providing its content and layout, where the characters or symbols to be painted on a screen is specified in the screen language component, and how to paint the characters and symbols is specified in the font component.

4 Claims, 15 Drawing Sheets

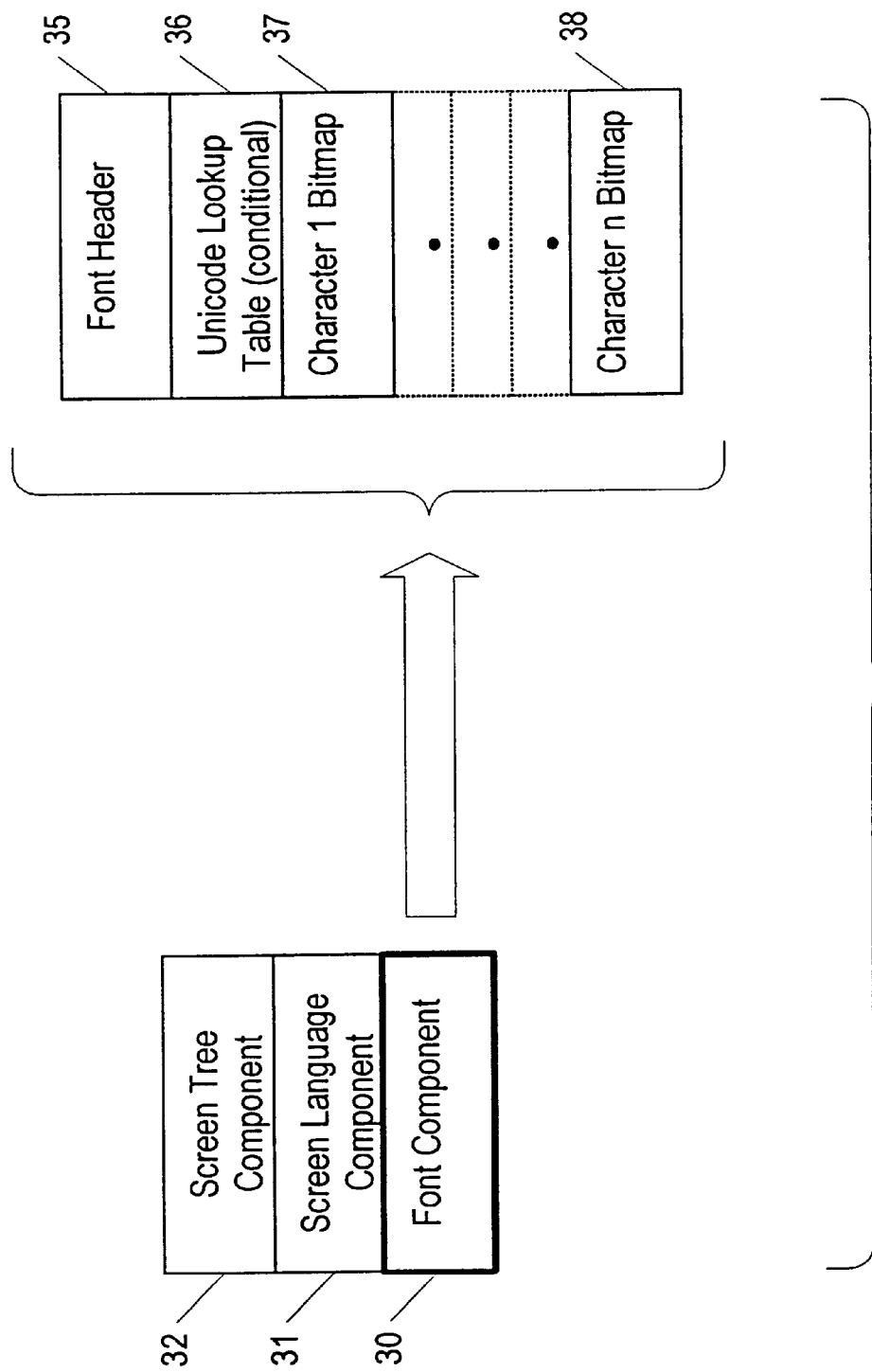

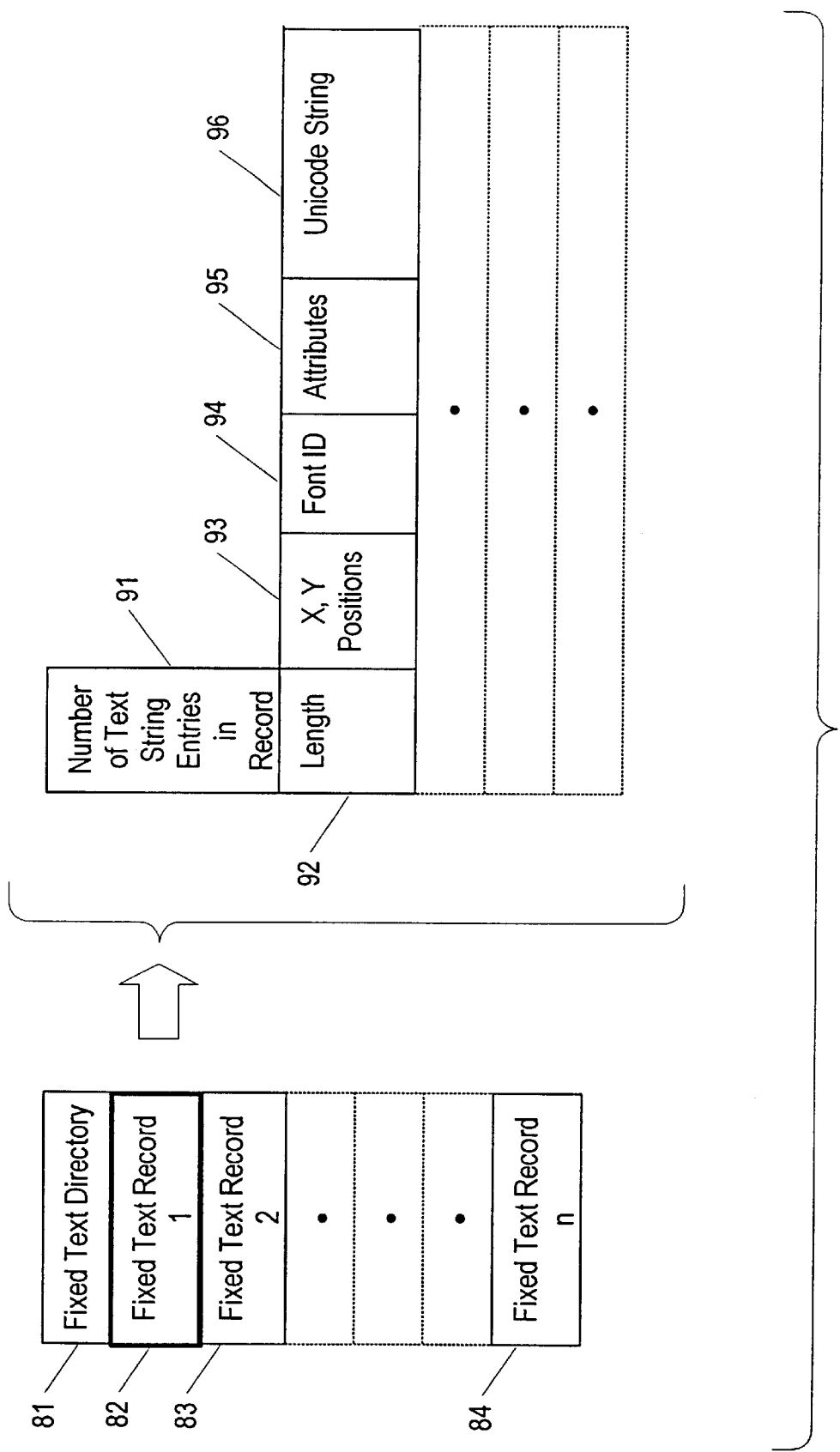

$ [0.33] — 231
230

Date: [Jul 01 1999] — 233
Ads: [Thanksgiving] — 235
Insc: [2nd Class] — 237
Acct: [Marketing] — 239

232 — Date
234 — Ads
236 — Insc
238 — Acct

Fig. 6B

CUSTOMIZABLE USER INTERFACE FOR A MAILING APPARATUS

This is a continuation of application number 09/364,080 filed on Jul. 30, 1999; now U.S. Pat. No. 6,266,055.

TECHNICAL FIELD

The present invention pertains to a user interface for a postage meter or other mailing equipment, and more particularly to a screen control architecture directed to facilitating the customizing of menus and other elements of a user interface displayed on a video display of a postage meter or other mailing equipment.

BACKGROUND OF THE INVENTION

To provide a means of communicating to a user the full functionality of a microprocessor-based postage meter or other kinds of mailing equipment, it is known in the art to provide a user interface, including a menu system, on a video display provided with the mailing equipment. But in the prior art, the user interface for a mailing apparatus, including menus, and also the function calls associated with different menu selections, are embedded in a control program for the postage meter, i.e., in the machine language instructions that control the mailing apparatus. This arrangement has the advantage of, usually, requiring less memory to hold a user interface and associated function calls. It also has the feature of nearly guaranteeing that a non-programmer, such as a general user, will not alter a user interface.

The change-resistant feature of a user interface is, today, in some situations, a disadvantage. Today, mailing equipment that is the same in functionality is sold worldwide; the user interface for the mailing equipment must therefore be adapted, or customized, to the language and culture associated with each market and also adapted to conform to the postal system requirements of each market. With the arrangement of the prior art, the control program must therefore often be changed for different markets.

Any change to a computer program, including the control program of mailing equipment, has risk, time and cost associated with the change. There is risk in that even small changes to a computer program can have unforeseen consequences. There is time and cost in that a change must be made by relatively sophisticated programmers. After a change, there is inventory cost in keeping and maintaining both the original and the changed versions for each country, i.e. in providing configuration management, this cost being relatively high because relatively sophisticated programmers must perform the configuration management.

What is needed is a way of altering a user interface without changing the control program itself, i.e., the coded machine instructions, but instead changing only the input data for the control program. A change along these lines would be to provide as input data to the control program the text to be displayed as part of the user interface. Then the text could be easily translated, depending on the market for the mailing equipment.

But in fully responding to the risk and cost of altering a control program, providing a user translation of the text of a user interface is often not enough. A menu system, and a user interface generally, makes use of various assumptions about how people will respond to an interface screen; and how people respond can vary dramatically from culture to culture, to the point where, for some markets, some assumptions about a user interface are simply incorrect, and the user interface does not work for that market.

Therefore, there is a need for an improved control system that provides for a flexible and adaptable user interface, while mitigating the disadvantages discussed above.

SUMMARY OF THE INVENTION

The present invention seeks to provide a control system that produces a user interface, including its overall look and feel, based only on information that is not coded as part of the control program, but instead provided as input data. Such an arrangement would allow changes to be made to a user interface of a mailing apparatus without involving control program re-coding, and thus avoid much of the risk and cost associated with customizing or adapting a mailing apparatus to a new market requiring changes in its user interface because of differences either in culture or in national postal regulation, compared to already established markets.

Accordingly, the present invention provides a customizable user interface for a mailing apparatus, comprising: a control program that is responsive to external input data and includes instructions for execution of all functions of the mailing apparatus, and instructions for painting a screen of the customizable user interface in response to the external input data, which specifies the screen, and including functions required to check and respond to an improper response to the customizable user interface. The external input data provides all specifications needed to distinguish one screen from another, and specifications needed to distinguish an action by the mailing apparatus in connection with use of a screen by a user, or in connection with an event to be communicated by the customizable user interface to the user.

In a particular embodiment of the present invention, the external input data comprises: a screen tree component, including, for each screen, an identification of a function to perform before displaying a screen (a pre function), an identification of a function to call after displaying a screen, and before calling a pre function for another screen (a post function), at least one keypress response specification, and optionally, at least one event response specification; and a screen language component, including fixed text data, field data (i.e. data provided at run-time either by a user or by the control program), table text data, and key map data.

All of the look and feel of a user interface for a mailing apparatus is thereby provided as input data to a user interface control program, allowing changes to be made to both the look and feel of the user interface without having to change the coded user interface control program.

BRIEF DESCRIPTION OF THE INVENTION

FIG. 6B is an illustration of an actual screen of a user interface according to the present invention.

DETAILED DESCRIPTION

Figure 1A:
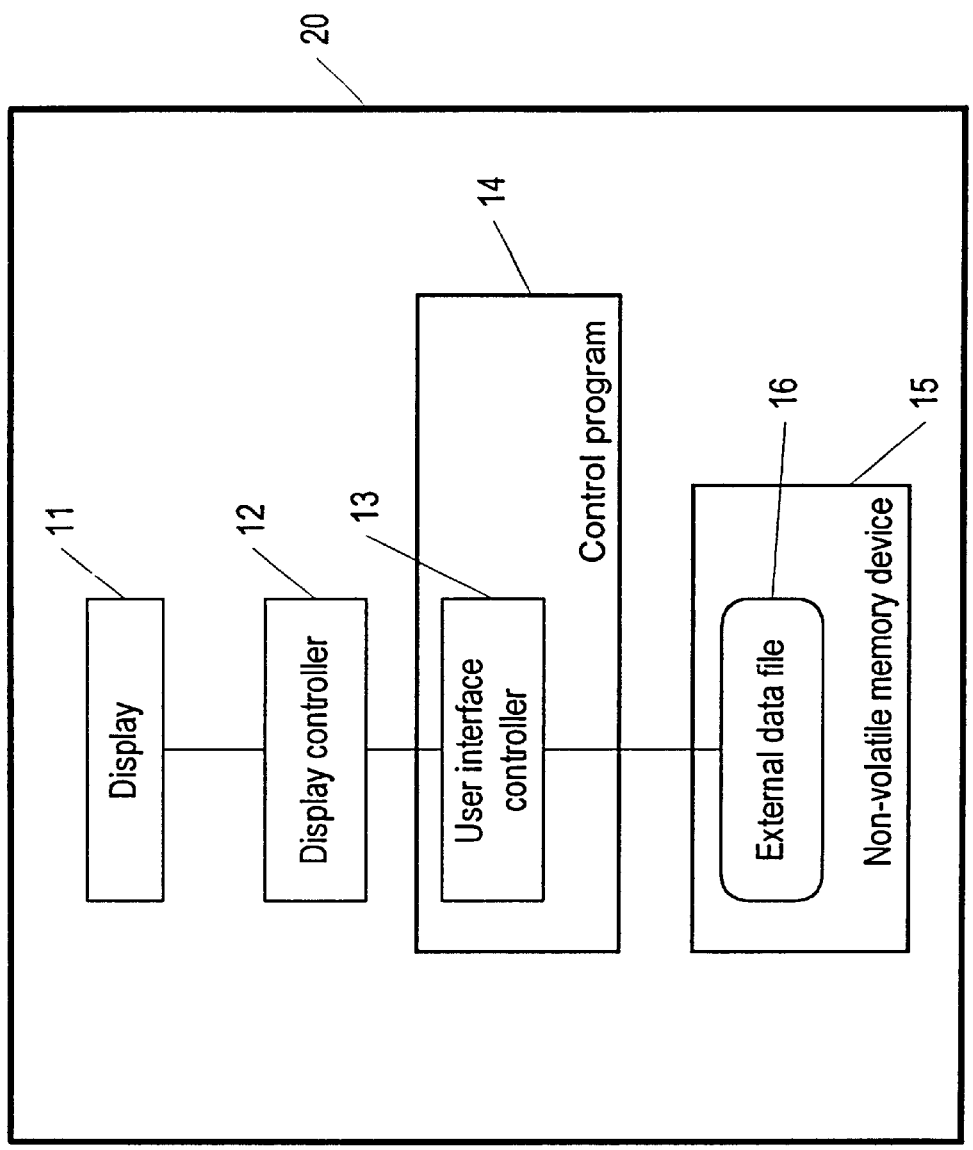
FIG. 1A is a block diagram showing some components of a mailing apparatus used to implement a user interface according to the present invention.
Figure 1B:
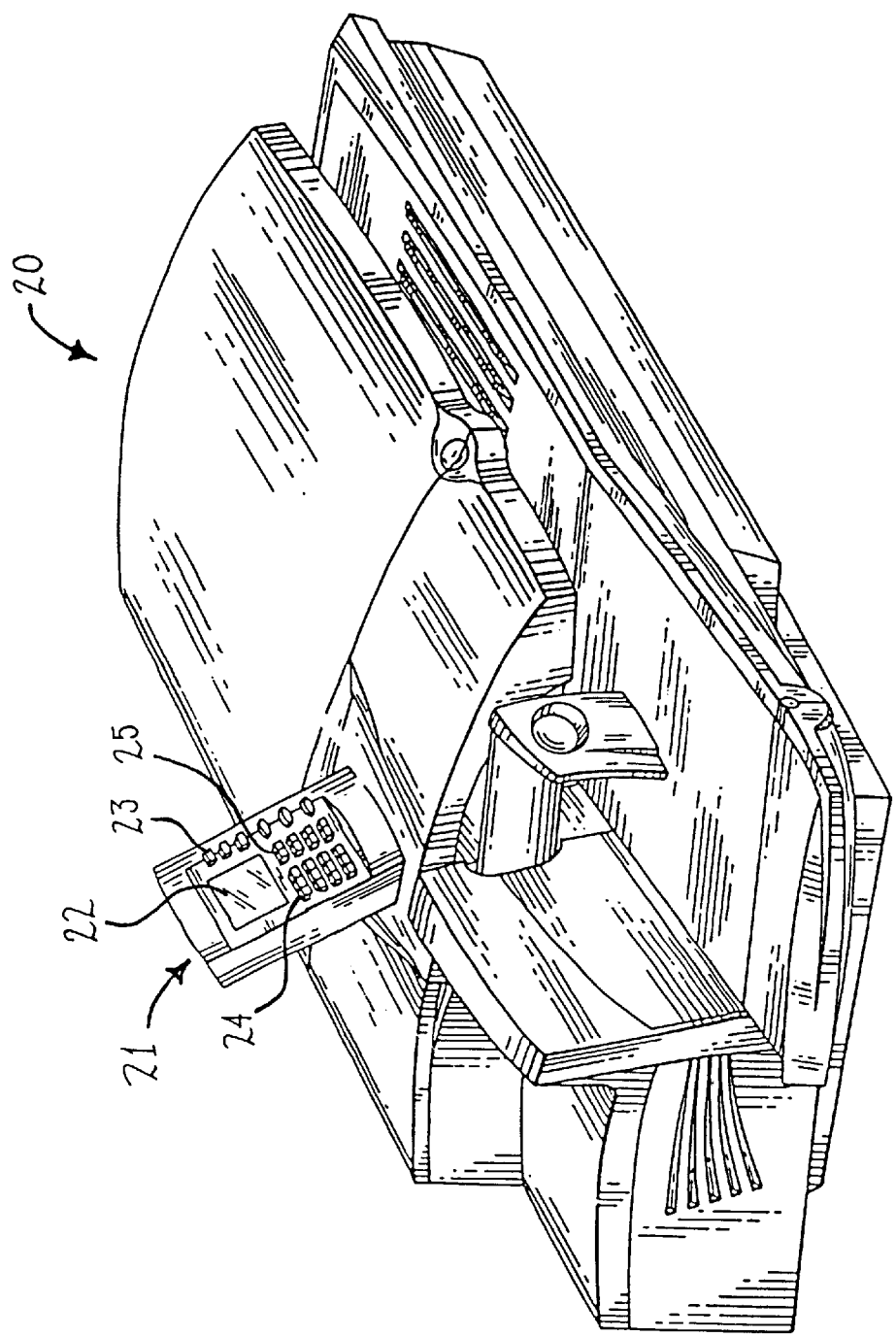
FIG. 1B is a simplified perspective view of a mailing apparatus illustrating one kind of mailing apparatus in which it is possible to incorporate the present invention.

Referring now to FIGS. 1A and 1B, in a mailing apparatus 20, a display 11, such as a liquid crystal display (LCD), is used to display a user interface according to signals provided by a display controller 12, the signals it provides corresponding to display commands provided by a user interface controller 13, as part of the overall control program 14 for the mailing apparatus. The user interface controller provides the display commands in response to data it reads as an external data file 15 in a non-volatile memory (NVM) device 16, such as a flash memory. It is the organization of the user interface as input data to the user interface controller that is the basis of the present invention.

There are many ways in which a user interface controller can be implemented so as to provide a user interface completely according to input data, from an external data file, according to the organization described below. One of ordinary skill in the art to which the present invention pertains could, without undue experimentation, provide such a user interface controller, and could do so using a wide range of programming languages and program implementation technologies. Accordingly, the description provided here is directed to explaining the preferred organization of a user interface, for a mailing machine, as an external data file.

The mailing apparatus 20 includes a printer module (not shown), a conveyor apparatus (not shown), a micro control system (not shown), other modules not shown for the sake of clarity, and user interface equipment 21 including a set of function keys 23, a numeric keypad 24, a set of (non-function-type) keys 25, and a display 22, which can be a cathode ray tube (CRT), light emitting diode (LED), LCD or other kind of display. The (non-function-type) keys allow a user to indicate commands that are not directly related to processing a mail piece, such as: enter, clear, download postage, generate report, and account setup. In contrast, the function keys are concerned with actions needed to process a mailpiece, such as: start, stop, print tape, reset batch counter, weigh mode on/off, sealer/moistener mode on/off.

By a user interface of a mailing apparatus is here meant a collection of screens by which information is communicated to a user, and by which a user invokes functionality on the part of the mailing apparatus. User interface equipment 21 is the means by which the operation of the user interface (software system) is communicated to a user. Generally, in seeking to have the mailing apparatus perform a particular function, or, more generally, enter a particular state, a user traverses screens to reach a particular screen by which the user is able to command that the mailing apparatus perform the particular function. There is therefore a web of interconnected screens, called here a tree, and in general, a design for a user interface can link any screen to any other screen (so that the term tree is only approximately apt).

Referring now to FIG. 2A and still referring to FIG. 1A, according to the present invention, a user interface for a mailing apparatus is provided as input data, held in the NVM device as an external data file 16, for input to the user interface controller 14, partitioned into three components, summarized here and described in greater detail below:

a font component 30, which is optional because an LCD controller may have embedded fonts, the font component providing all of the actual fonts that are available for use on a screen by the user interface;

a screen language component 31, including for each screen the text strings and fields that are displayed on the screen and the location of the strings and fields, as well as the fonts to use to display them; and a screen tree component 32, including all data that relates to the actions that can be performed on a screen and the means of traversing from one screen to another.

In the preferred embodiment, to indicate a particular character for display on a screen, Unicode is used. The Unicode standard was developed to provide an international character encoding standard. The designers of the Unicode standard wanted and did provide a more efficient and flexible method of character identification. The Unicode standard includes characters of all major International Standards approved and published before Dec. 31, 1990, as well as other characters not in previous standards. The characters are encoded in the Unicode standard without duplication. The codes within the Unicode standard are 16-bits (or 2 bytes) wide.

For a general overview discussion of the Unicode standard, see U.S. Pat. No. 5,793,381 to Edberg, et al., for a Unicode Converter, hereby incorporated by reference. For additional detail about the Unicode standard, see, e.g., The Unicode Standard, Worldwide Character Encoding, Version 1.0, Addison-Wesley 1991. (Version 1.1 is also available for additional details).

The organization of the user interface as an external data file, in the preferred embodiment of the invention, is described below in detail. Some of the organization is illustrated in FIGS. 2A–4B.

The Font Component

Still referring to FIG. 2A, the screen font component contains the following elements:

a font header 35;

a Unicode lookup table (conditional) 36; and bitmaps 37, 38 for characters 1, . . . , n.

Each screen font is described by a screen font component. Usually, more than one screen font is stored in NVM.

The Font Header Element

Figure 2B:
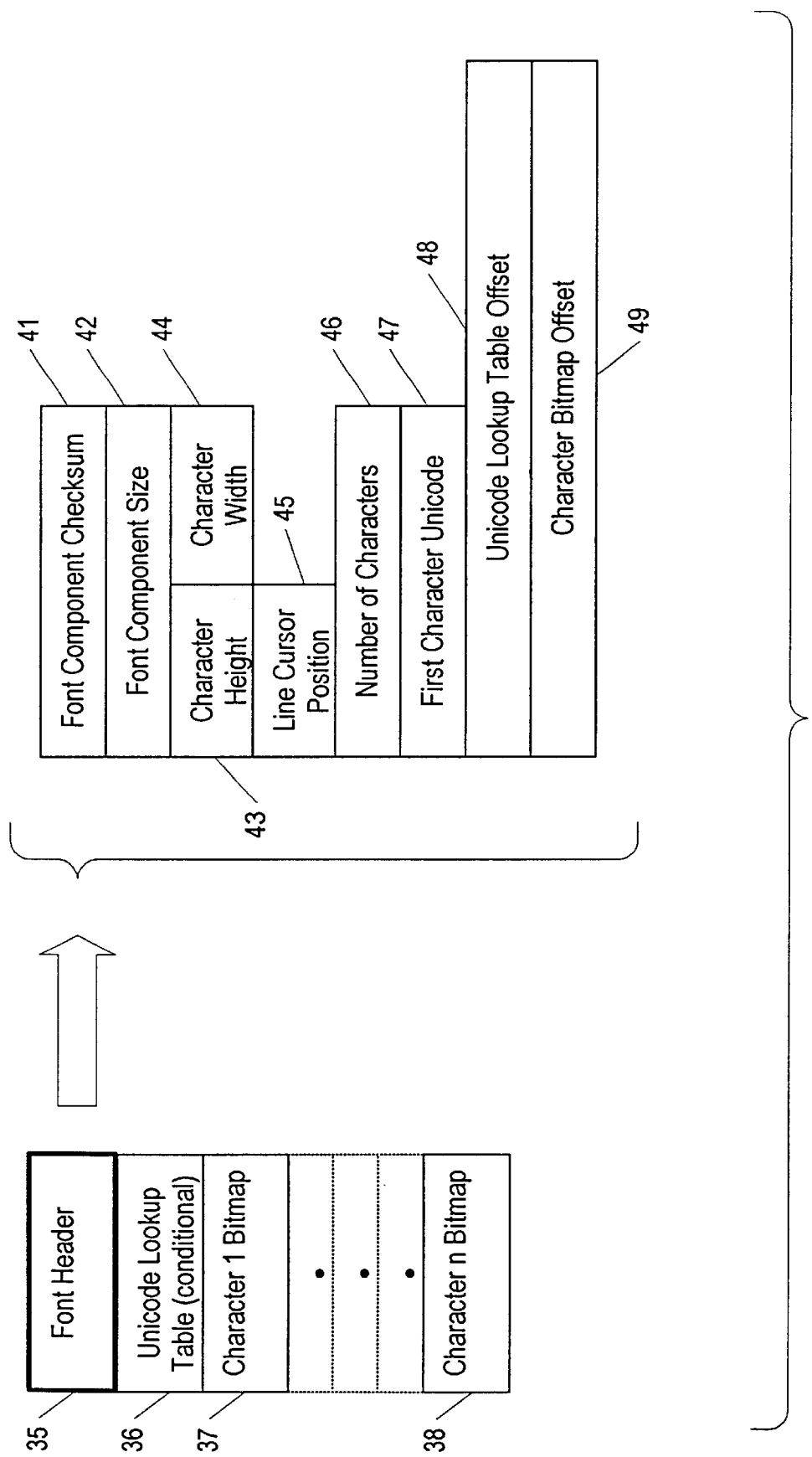
FIGS. 2A–4B are data organization diagrams, indicating in part how a user interface is organized as an external data file.

Referring now to FIG. 2B, the font header includes the following items:

a font component checksum 41 (word sum of the entire contents of the font component);.

the font component size 42;

the character height 43 (in dots) (same height for all characters in the font);

the character width 44 (in dots) (same width for all characters in the font);

a line cursor position 45, i.e. the row number that the blinking line cursor should appear on within any character of the font (valid range is from 0 to (character height−1) (useful for fonts containing descending characters, such as "g" or "y", where it might be undesirable for the cursor to be placed on the bottom row of the character);

the number of characters value 46, representing the number of characters included in the screen font, i.e. the number of character bitmaps that are contained in the font component;

a first character Unicode value 47, indicating the Unicode value assigned to the first character contained in the font;

the Unicode lookup table offset 48 (if 0, a Unicode lookup table is not used and the font must contain a sequential block of ascending Unicode characters); and the character bitmap offset 49, i.e. the offset of the first character bitmap in the component.

Unicode Lookup Tables and Font Hole Maps

A Unicode lookup table is included in the font component only if the corresponding font does not sequentially map to a range of Unicode values. An example of this would be the Kanji alphabet, where there are thousands of possible characters, but only several hundred of them are used in some mailing machines. The selected characters may fall anywhere in the Unicode range. There is usually a drawback to using a Unicode lookup table: it is often slower. However, it is sometimes necessary to use such a lookup table when memory resources must be conserved.

A Unicode lookup table includes the following items:

Unicode value for characters 1, . . . , n.

The characters in the Unicode lookup table are usually stored in ascending Unicode order.

The Unicode lookup table described above requires searching the lookup table for a specific bitmap. In some situations, instead of a font lookup table, a font hole map is used, which involves the following items:

a character present indicator for indicating if a particular character is present in a font; and an index into memory where the character in the font is stored.

The index can be a running count of characters present in the font. The index is not used if the character present indicator is false.

The font hole map contains the valid range of all Unicode characters present in the font. Therefore, specific characters of a font can be loaded. The Unicode characters should still be loaded sequentially in memory for optimal performance.

The Character Bitmaps

The character bitmaps define how each character of the font is drawn on the LCD. The bitmaps are given horizontally, with the top row coming first, the second row coming second, and so on. The number of bytes needed to define a row depends on the character width. If the width is eight dots or less, one byte is used per row. If there are between nine and sixteen dots, two bytes are required per row. Any unused bits in a row should be filled with zeroes.

Figure 5:
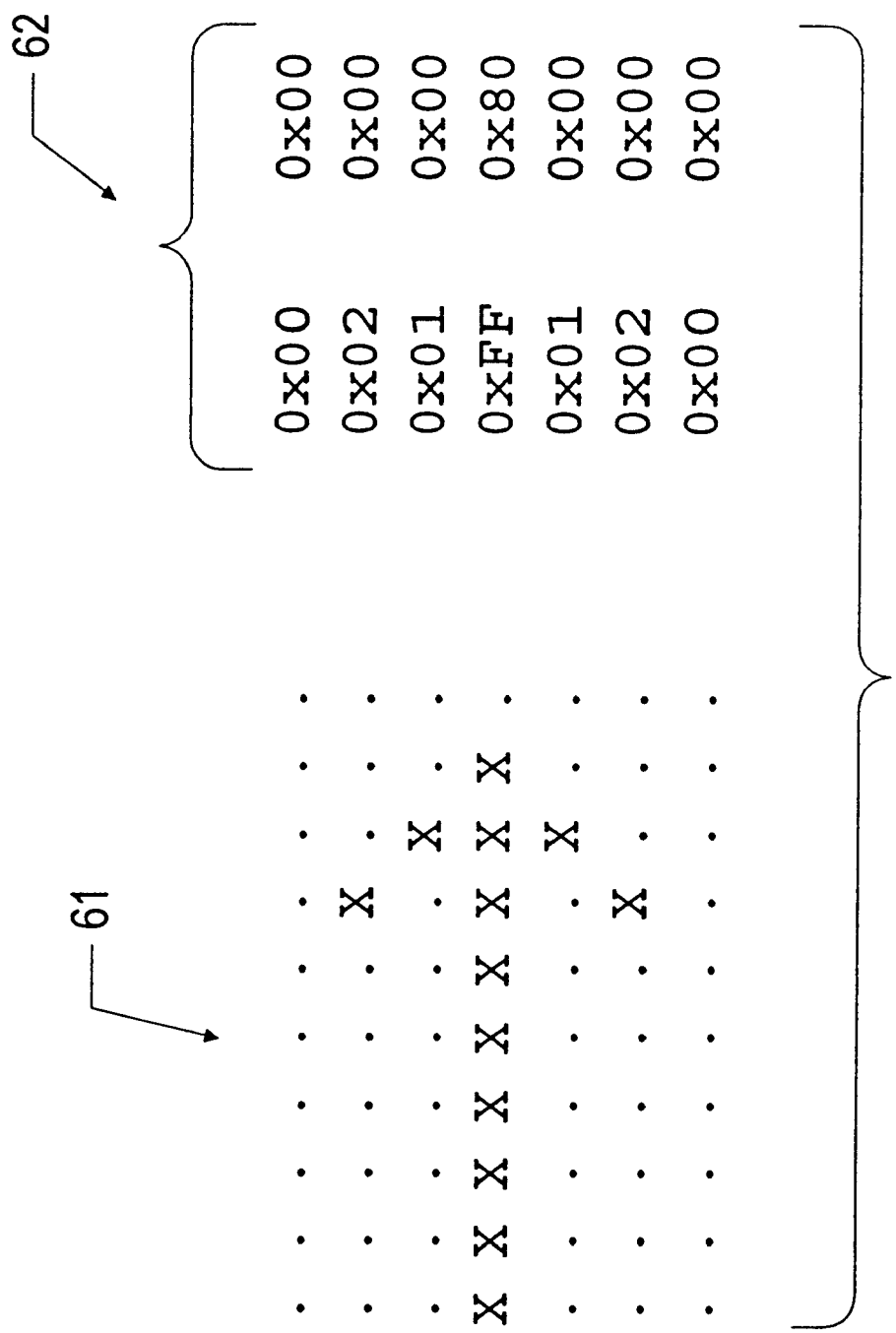
FIG. 5 is a character bit map for a right arrow.

An example is provided as FIG. 5, showing a character bitmap 61 for a right arrow having a width of ten dots and a height of seven dots. Fourteen bytes are required to define the character bitmap. The bitmap is represented in memory by a value 62 (shown in hexadecimal), which, for a right arrow, is: 00 00 02 00 01 00 FF 80 01 00 02 00 00 00.

The bitmap does not have to be an alphanumeric character, as in the example of FIG. 5. It can be an image, thus giving the control program the ability to map Unicode to either an image or a character. In addition, Unicode provides a special area for defining custom characters. Therefore, it is possible to create custom characters without affecting any other character used in a language.

A font driver (software) is used to display a screen, according to the font specified in the screen language component, and according to the font specification in the font component. The font driver can be made to receive an interrupt from the display electronics when a reset of the display controller (hardware) due to static discharge is detected.. By caching the display's current pixel pattern in RAM, the complete bit-mapped image displayed at the time of the reset can be repainted on the screen without interruption. If the display controller does not supply an interrupt, the font driver can be made to pick a refresh rate, and then take the cached image and pass it to the display controller. Such caching and repainting can mask electrical problems, making screens easier to read.

This organization of a font component of a user interface in an external data file provides the following advantages:

A common software driver can be used to handle multiple fonts.

An entire font does not need to be loaded into memory, because algorithms can be used to fill in gaps in the characters.

If all characters of a font are loaded, font accesses are rapid because neither searching nor hole mapping is required.

Special characters can be created since Unicode is mapped by the user interface control program. Thus, for example, a character can be created in the image of an envelope, and then the user interface can direct that the character/envelope be positioned at different locations on a screen so as to simulate an envelope being moved from one position in a mailing machine to another.

The display controller can be refreshed when there are static discharges.

The starting character of a font can be varied since the base character is stored in memory.

More than one font can be used with a language.

More than one font can be used on a screen.

Fonts can be shared by different languages.

The font component can be changed without affecting the language or screens as long as used characters are not deleted.

ASCII applications can use the same algorithm if less memory is available.

The displayed fonts can be transmitted via a communications port to a remote device.

The font component can be remotely loaded.

A system without a display controller that uses a processor to refresh the display can also refresh a display out of a cache, masking electrical problems.

Screen Language Component

The screen language component, in essence, provides the look of the user interface, given the font component; it allows screens to be translated and even completely reformatted. In the preferred embodiment, it includes the look of screens for each of several languages; one instance of the component is included in the NVM device for each language supported.

Figure 3A:
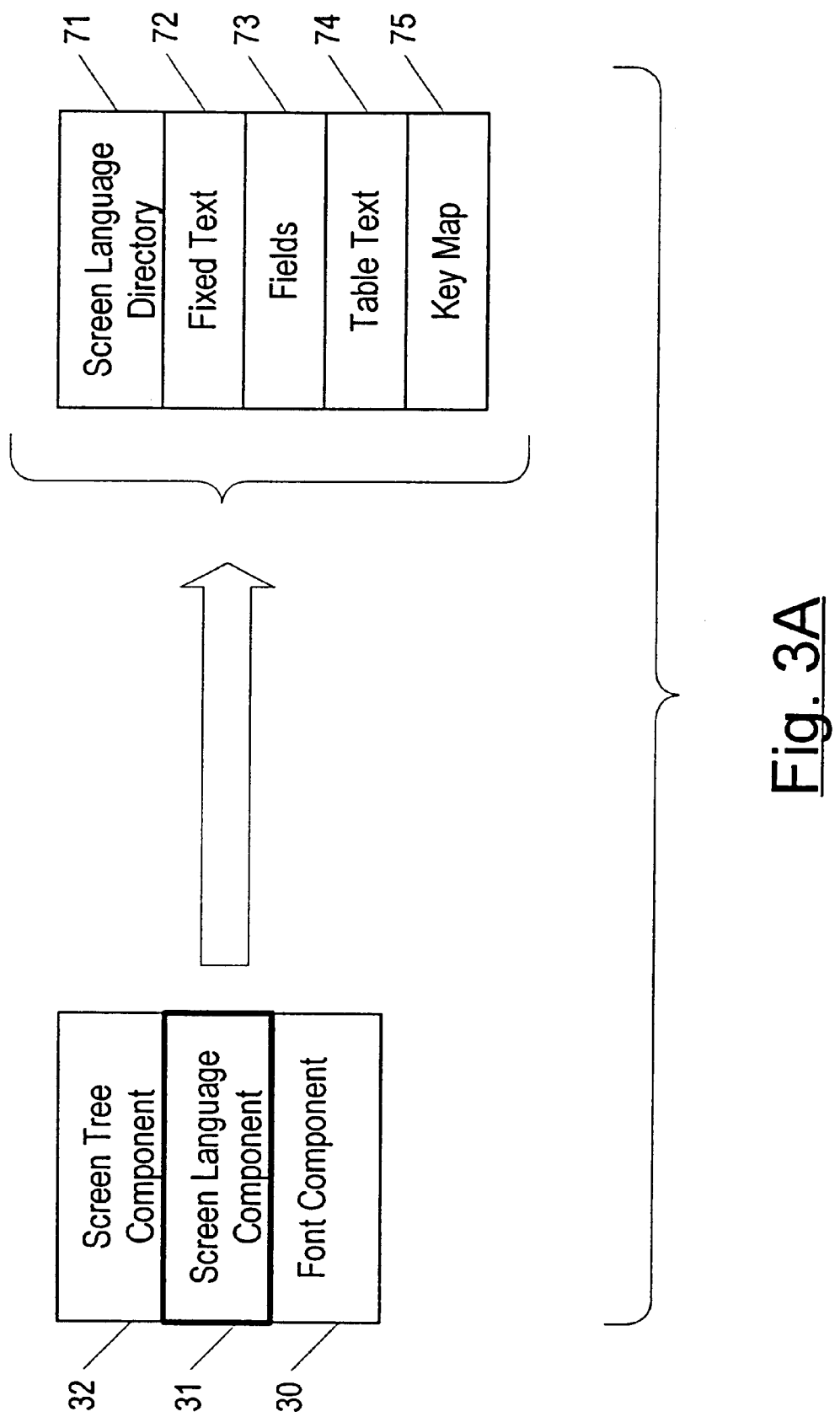

Referring now to FIG. 3A, the screen language component includes the following items, each described in more detail below:

a screen language directory element 71;

a fixed text element 72;

a fields element 73;

a table text element 74; and a key map element 75.

The fixed text element and the fields element each contain one record of information for each screen. For example, record 3 of the fixed text element always contains the fixed text strings that appear on screen 3. (Screen 3 would be defined in the third screen entry of the screen tree component.) The table text element contains an arbitrary number of records that are referenced from the fields element. The key map element contains an arbitrary number of key-to-Unicode bindings.

Screen Language Directory Element

The screen language directory element includes the following items:

screen language component checksum;

screen language component size;

offset of fixed text;

offset of fields;

offset of table text; and offset to key map. The screen language directory element is always stored at the beginning of the screen language component, at offset 0. The directory contains some general component information as well as the offset of each of the other elements in the component. The directory has a fixed size.

The component checksum is the word sum of the entire contents of the screen language component. The component size is the size, in bytes, of the entire screen language component. Each offset is a four-byte offset that specifies the location of another element in the component.

Fixed Text Element

Figure 3B:
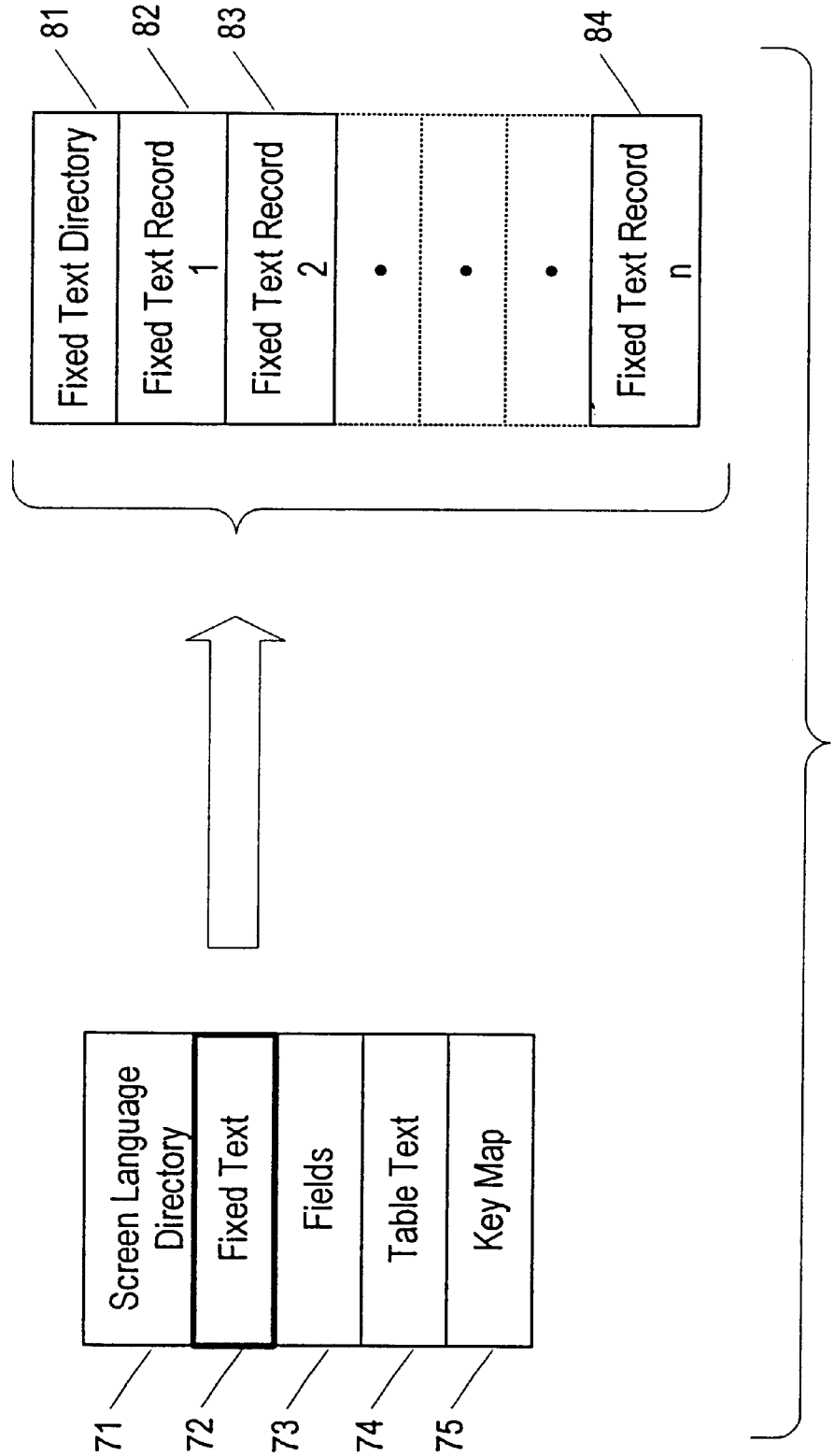

Referring now to FIG. 3B, the fixed text element includes the following items:

a fixed text directory 81; and fixed text records 82, 83, 84 for records 1, . . . , n.

The fixed text directory includes the following items:

number of fixed text records (two-byte value specifying the total number of fixed text records stored in the fixed text element); and local offsets of fixed text record 1, . . . , n (offset from the beginning of the fixed text element to each fixed text record).

The fixed text directory, as well as each of the fixed text records, can be of variable size. The purpose of the fixed text directory is to specify the location of each of the fixed text records within this element.

Referring now to FIG. 3C, each fixed text record includes the following items:

a value 91 for the number of text string entries in the record; and for each text string: its length (size) 92, its x, y positions 93 (on the screen), its font id 94, attributes 95 for display of the text string (e.g. normal text, reverse video, blinking, etc.), and a Unicode string 96 representing the text string (a Unicode string in the preferred embodiment, but could be ASCII in implementations where it is important to conserve memory).

There is one 4-byte local offset for each fixed text record in the fixed text element.

Fields Element

Figure 3D:
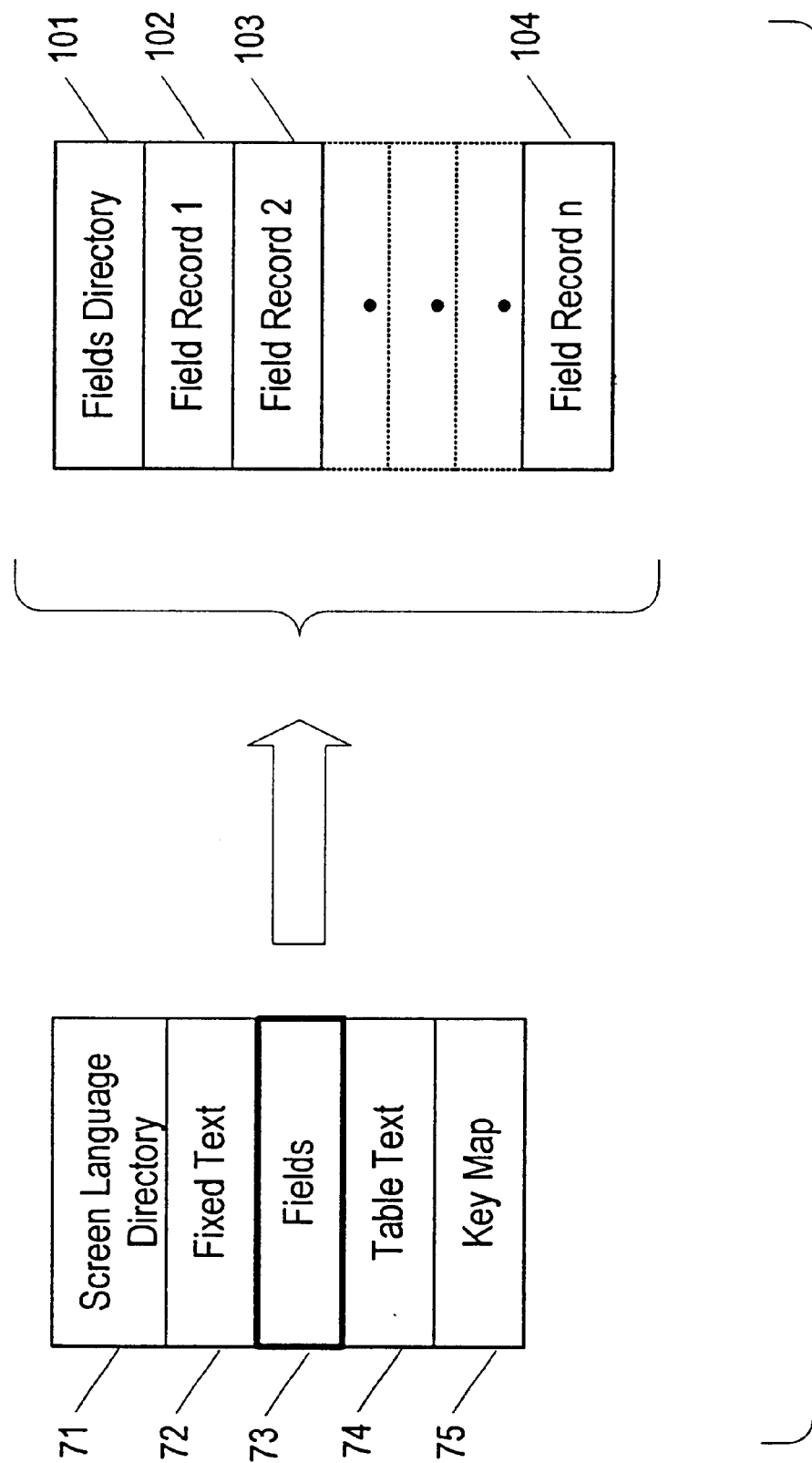

Referring now to FIG. 3D, the fields element includes the following items:

a fields directory 101; and field records 102, 103, 104 for field records 1, . . . , n respectively.

The fields directory includes the following items:

number of field records in the field element; and local offset of field records 1, . . . , n (offset from the beginning of the fields element to each field record).

The fields directory, as well as each of the field records, can be of variable size. The fields directory specifies the location of each of the field records within this element.

Sometimes a user needs to enter a field value that can be picked from a list. Examples include days of the week and months of the year. Sometimes there will be two choices, such as "Yes" or "No." Other times, there will be menu-based options that can be provided in a list. In the present invention, a field record (i.e. a record of data provided either by a user or by the control program) can refer to a table, i.e. a list, from which a user can select the value for a field.

Figure 3E:
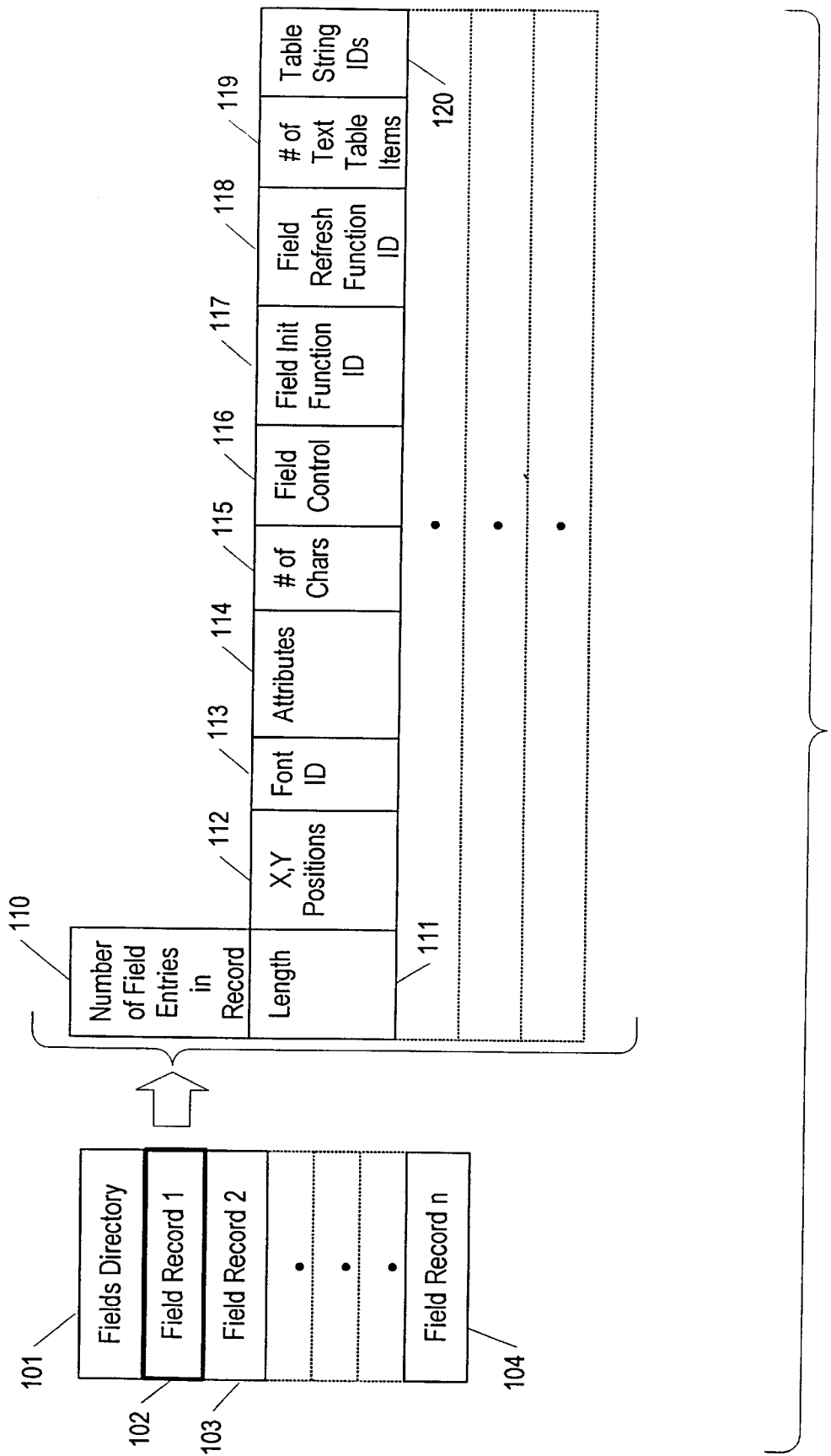

Referring now to FIG. 3E, each field record includes the following items:

a value 110 indicating the number of field entries in the record; and for each field entry: the length 111 of the of field entry (i.e. the size, usually in bytes), the x, y positions 112 for the field entry (on the screen), the font id 113, attributes 114 for display of text entered as the field value (e.g. reverse video), the number of characters 115 allowed for the field, a field control 116 (further information, besides attributes, on how the field value is to be formatted and how it is to be entered, including whether some characters, such as a hyphen in a social security number, are jumped over as a user enters the field), field initialization function id 117, a field refresh function id 118, a number of text table items value 119 (indicating the number of text table items in a text table associated with the field, and set to 0 if there is no text table associated with the field); and table string identifications 120 of the strings that comprise the text table for the field (if there is a table for the field).

Table Text Element

The table text element includes the following items:

table text directory;

table text entries 1, . . . , n;

The table text directory, as well as each of the table text entries, can be of variable size. The table text element differs from the other elements in the screen language component. The other elements are subdivided into records (with multiple entries) that directly map to a single screen. In the case of the table text element, all entries can be stacked in the element in an arbitrary order. The table text element serves as a simple database of strings that is used by the fields element to create tables. This allows different fields to reference the same strings, thus conserving the NVM resource.

The table text directory includes the following elements:

number of table text entries; and local offset of table text entries 1, . . . , n.

The purpose of the table text directory is to specify the location of each of the table text entries within the table text element.

Each table text entry of the table text element includes the following item:

a Unicode String.

The text tables can incorporate an attribute field so that different entries can be displayed differently.

Key Map Element

The key map element includes the following items:

number of key bindings; and key bindings 1, . . . , n, each including key control data (whether or not a key must be pressed in combination with another key such as a shift key), the identification of the hard key being mapped, and the Unicode character assigned to the key being mapped.

The key map element assigns Unicode character values to different keypresses. This is necessary because different languages require different character sets.

In addition to the tailoring of the look of the user interface indicated by the above items, in the preferred embodiment, even cursor positioning for entering a field value and add/insert capability of the cursor can be tailored to a market. Further, the text attributes can be tailored to the hardware display being used. Thus, the user interface control program itself can be hardware independent, and the user interface adapted to different hardware by altering the input data specifying the user interface look and feel. (If an LCD controller has embedded fonts, as indicated above is sometimes the case, to change fonts the user interface control program may have to be altered, but nothing else.)

This organization of a screen language component of a user interface in an external data file provides the following advantages:

- The same control program can be used regardless of the screen language content.
- Translations can be easily implemented on the language.
- The position of fixed text can be changed on a language basis.
- The fonts can be varied on a language basis.
- Text attributes (reverse video, blinking, and so on) can be changed on a per language basis.
- Using Unicode eases implementing non-Latin-character based languages.
- Checksums guard against tampering.
- Alignment of text can be controlled on a language basis.
- Lists of data can be associated with screens and reused.
- Different control program functions can be called to refresh and initialize the fields that are displayed as part of a screen, giving fields a different look in different markets, without altering the control program.
- The number of field entries can be varied on a per language basis.
- The lengths of the text can vary from country to country
- Screens can be completely reformatted in terms of content and look from country to country.
- More than one language can be stored in NVM as part of a common screen structure/user interface.
- The character displayed by a keypress can vary from language to language.
- Cursor positioning and add/insert capability of the cursor can be tailored to a specific country.
- The field text item eliminates the need for loading separate parameters into a mailing apparatus, allowing translation to be made more easily. For example, the months of the year can be placed in a list instead of being provided as separate parameters (which is typically done).
- Language components can be loaded at manufacturing.
- Language components can be loaded remotely (by modem or other means of telecommunication) without changing the control program.
- The text attributes can be tailored to the hardware display that is being used. Any specific attributes can be used by this data structure. It is hardware independent.
- American Standard Code for Information Interchange (ASCII) can be used instead of Unicode if the scope of the translations is limited and memory conservation is required.
- The text tables can incorporate an attribute field so that different entries can be displayed differently.

Screen Tree Component

Figure 4A:
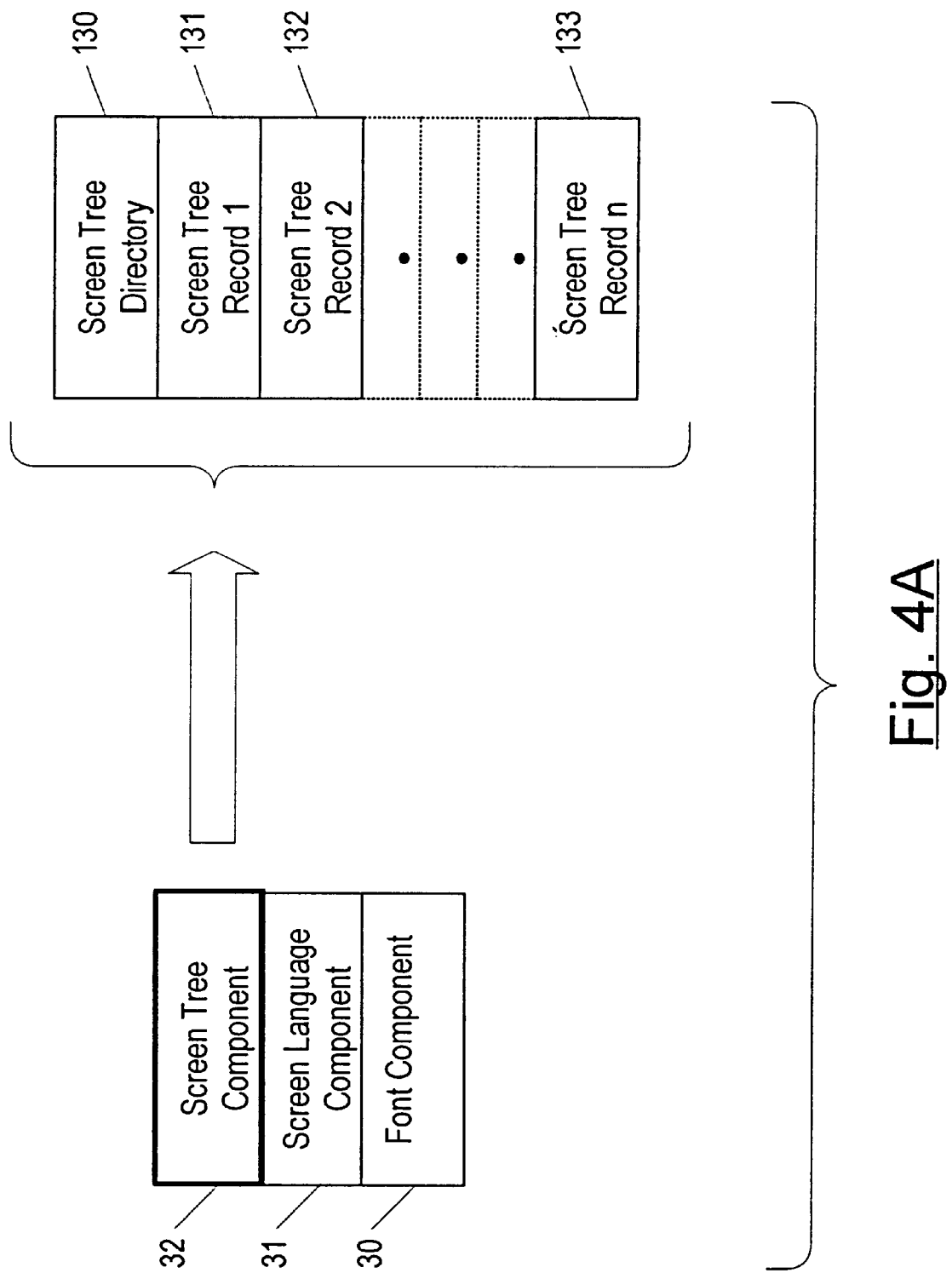

Referring now to FIG. 4A, the screen tree component includes the following items:

- a screen tree directory 130; and
- screen tree records 131, 132, 133 for records 1, ..., n respectively.

The screen tree component defines data applicable to each screen as a whole, and any information about the relationship between screens. The screen tree directory, as well as each of the screen tree records, can be of variable size. The screen tree component makes possible assigning keys and custom defined events to a response by a mailing apparatus. These assignments provide the feel of the interface, i.e. how the user interface responds to an action by a user or to an event that should be communicated to a user, such as a change in calendar date, requiring in some systems that the mailing apparatus be physically adjusted for printing the new date.

Screen Tree Directory Element

The screen tree directory includes the following items:

- a screen tree component checksum (the word sum of the entire contents of the screen tree component);
- a screen tree component size (the size of the entire screen tree component);
- the number of screen tree records in the screen tree component; and
- offsets of screen tree records 1, ..., n (each relative to the beginning of the screen tree component).

The screen tree directory specifies the location of each of the screen tree records within the screen tree component.

Screen Tree Record Element

Figure 4B:
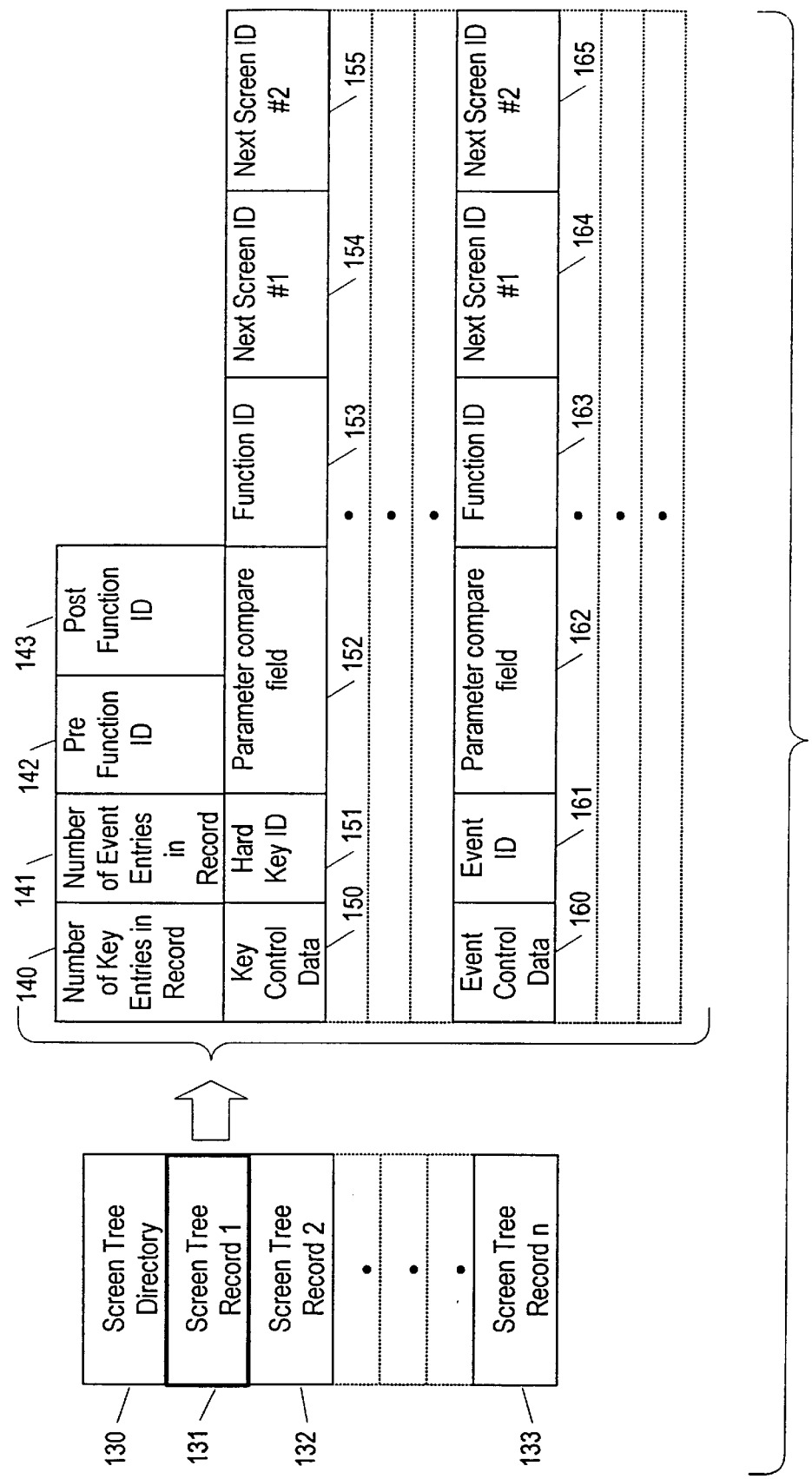

Referring now to FIG. 4B, each screen tree record includes the following items:

- a number of key entries in record value 140 (i.e. the number of different key press combinations that are active on the screen); a number of event entries in record value 141 (i.e. the number of different events that are to be communicated by the screen); a pre function id 142 (the identification of a function to call before displaying the screen); a post function id 143 (the identification of a function to call after displaying the screen, and before calling a pre function for another screen);
- for each key entry: key control data 150 (indicating whether the user interface is to respond to a key press when the key is on the way down, or on the way up, and whether one or more other keys must be pressed in combination with the key); a hard key id 151 (the key being mapped); a parameter compare field 152 (a field used to designate a parameter requirement that must be satisfied in order for the key press to be operative); a function id 153 (the identification for a function to call to process the key press); a next screen id #1 154 and next screen id #2 155 (identification of either of two screens to display next, if any); and
- for each event entry: event control data 160, for providing information about circumstances in which an event occurs; an event id 161, for identifying the event that is being mapped to an action by the mailing apparatus; a parameter compare field 162 for designating a value a parameter, known to the control program, must have for the event to cause an action by the user interface control program; a function id 163 for indicating a function to process a key pressed in response to communicating the event to a user; a next screen id #1 164 and a next screen id #2 165 for identifying either of two screens to display next, if any.

Each screen tree record contains some high level screen information, a set of zero or more fixed-length key entries, and a set of zero or more fixed-length event entries.

In the preferred embodiment, the control program knows the values of parameters representing the current state of a mailing machine, and on the basis of logical operations on these parameters, the user interface control program decides what screen to display next. In one aspect of the invention, this is accomplished by having the control program place at a predetermined location in memory a series of for example eight bits corresponding to eight items of state information, and associating a predetermined name with the eight-bit data object, the eight-bit data object called here a state parameter. The external data file then provides a series of screen records, each indicating a different screen, and each indicating the state parameter by name, and indicating an operand and a binary logical operator to be used to cause the user interface control program to display the screen of the same record. For example, for a particular screen, a particular state parameter may be named, an operand may be specified to be 1010 0000, and a binary logical operator may be specified to be OR. Then the user interface will display the screen for that operand and logical operator only if the result of OR(operand, state parameter value for state parameter of the name indicated) evaluates to true.

In addition, any situation identifiable by the control program of the mailing apparatus can be an event, because what is an event is entirely data driven; if a situation can be assigned an id, it can be used as an event.

This organization of a screen tree component of a user interface in an external data file provides the following advantages:

- A generic software driver can be written to traverse the screens.
- The user interface control program is usable with a range of mailing equipment.
- State parameters for the meter, maintained in RAM, can be used to decide what screen to display next. The state parameters are not just checked; a logical operation can be used on them.
- Keypresses and events are handled on a per screen basis; there is no hard-coded behavior.
- Screen traversal information is independent of the control program; it is a part of the data that maps keys, states, and screens.
- What is an event is entirely data driven; all that is needed is to provide an identification for a state of the mailing apparatus for the state to be recognized as an event.
- Different screen components can be put into NVM with different patterns.
- A single screen component can be designed with traversal information to support multiple product configurations.
- Any key can be used as a shift key on a screen.
- Checksums can be used to validate that the screen component has not been changed without proper authorization.
- Screen traversals can vary on a country per country basis, using the same control program.
- More than one state parameter, i.e. item of current state information, can be specified as a basis for a decision by the control program; and logical operations involving several parameters can be used to decide what screen to display next.

Further Description of User Interface Overall

Figure 6A:
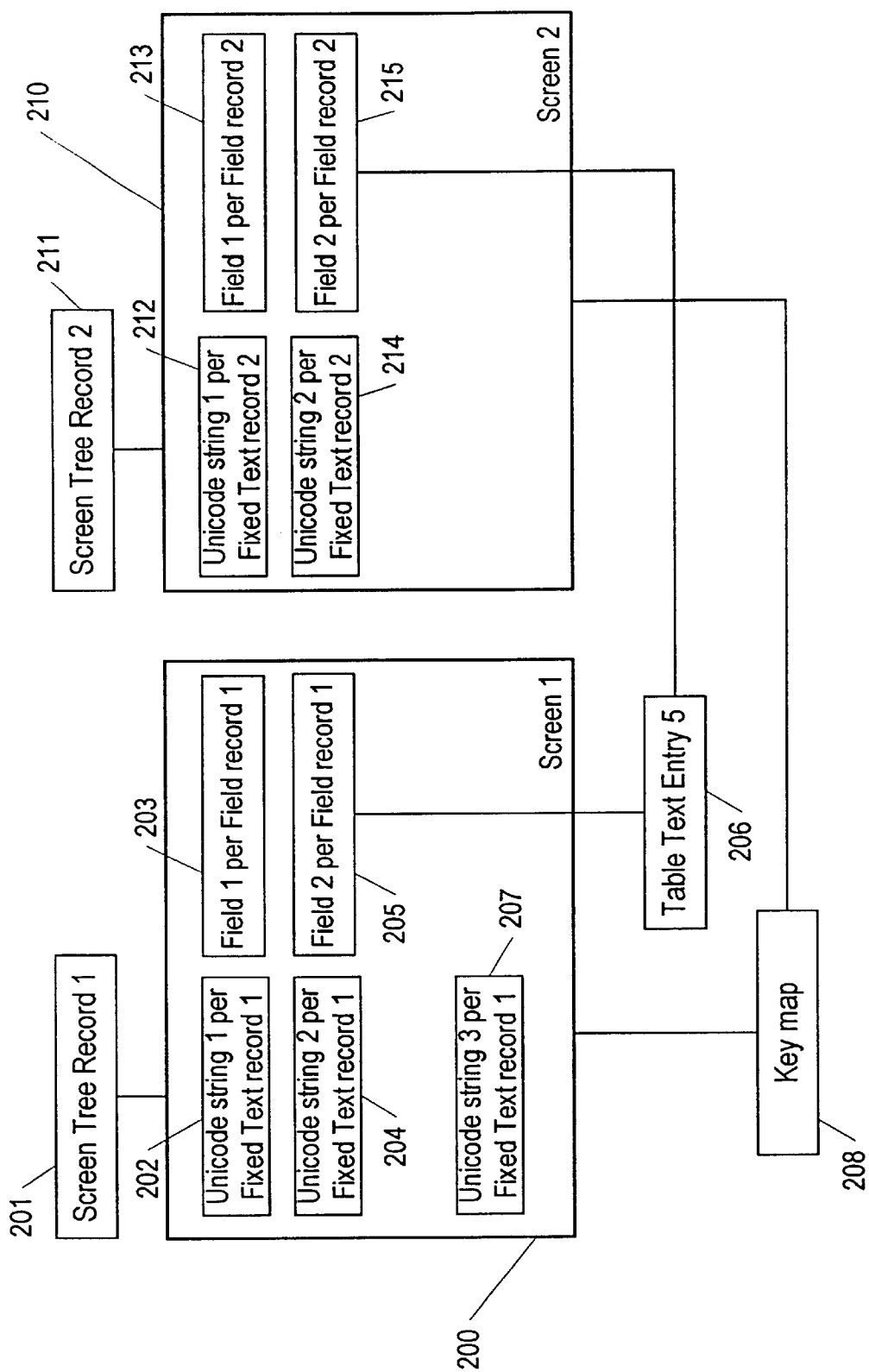
FIG. 6A is a block diagram along with a representation of two screens, showing the relationship of data components of the present invention to user interface screens.

Referring now to FIG. 6A, a screen #1 200 according to the present invention is built up out of the screen language components, so as to provide a Unicode string #1 per fixed text record #1 202, an area of the screen set aside for entry of field #1, by the user interface control program, for field record #1 203, a Unicode string #2 per fixed text record #1 204, a space set aside for entry of field #2, by a user, per field record #1 205, the field value to be selected from a list provided by table text entry #5 206, and a Unicode string #3 per fixed text record #1 207.

Thus, FIG. 6A shows one field with a value to be provided by the control program, and one by a user. Usually, most fields on a screen are to be provided with values by the control program, through its user interface program constituent, not by a user.

Referring now to FIG. 6B, a sample screen for a postage machine, such as shown in FIG. 1A, is shown as it would actually appear on a display such as an LCD. The dollar sign 230 would usually be indicated as a string, compared to a field, in the external data file specifying the user interface. The postage "0.33" 231 is a field value that can be input either by a user directly into the user interface control program, or provided through an external device (not shown), such as a scale coupled to the postage machine.

The text "Date:" 232 is a text string associated with a date field 233, and is used as either a prompt to a user, in case of a user providing the value of the date field, or as information about the date field, i.e. that the value represents the date that will be marked on the next mail piece run through the postage meter.

The text "Ads:" 234 is a text string that indicates that what follows is an advertisement, or more generally any sort of message, that will be printed on the next mail piece run through the postage meter. The text "Thanksgiving" 235 is a value of another field, one that is usually predetermined, and so usually provided by the user interface control program, not a user.

The text "Insc:" 236 is a text string used to indicate that the field value "2nd Class" 237 is the so-called inscription that will be printed on the next mail piece run through the postage meter. Such a field value is almost always provided by an external device to the user interface control program, i.e. through a user input to a scale coupled to the postage machine.

The text "Acct:" 238 is a text string used to indicate that what follows is a field value 239, i.e. "Marketing," indicating that the marketing department of the organization using the postage meter will be charged for the postage for the next mail piece run through the mailing machine.

Referring again to FIG. 6A, the same list from table text entry #5 206 is also made available at screen #2 210 for selection of the entry there of the field #2 per field record #2 215. Screen #2 also includes a Unicode string #1 per fixed text record #2 212, an area of the screen set aside for entry of field #1 for field record #2 213, and a Unicode string #2 per fixed text record #2 214.

Still referring to FIG. 6A, both screen #1 200 and screen #2 210 are based on the same key map 208 of the screen language components. This key map provides that when a user is entering a field value using the keys of the postage meter or mailing equipment, one or another character will be displayed in the space on the screen set aside for entry of the field value in response to each particular key pressed.

Also as shown in FIG. 6A, associated with each of these screens is a complete screen tree record. Thus, associated with screen #1 200 is screen tree record #1 201, and associated with screen #2 210 is screen tree record #1 211.

Figure 7:
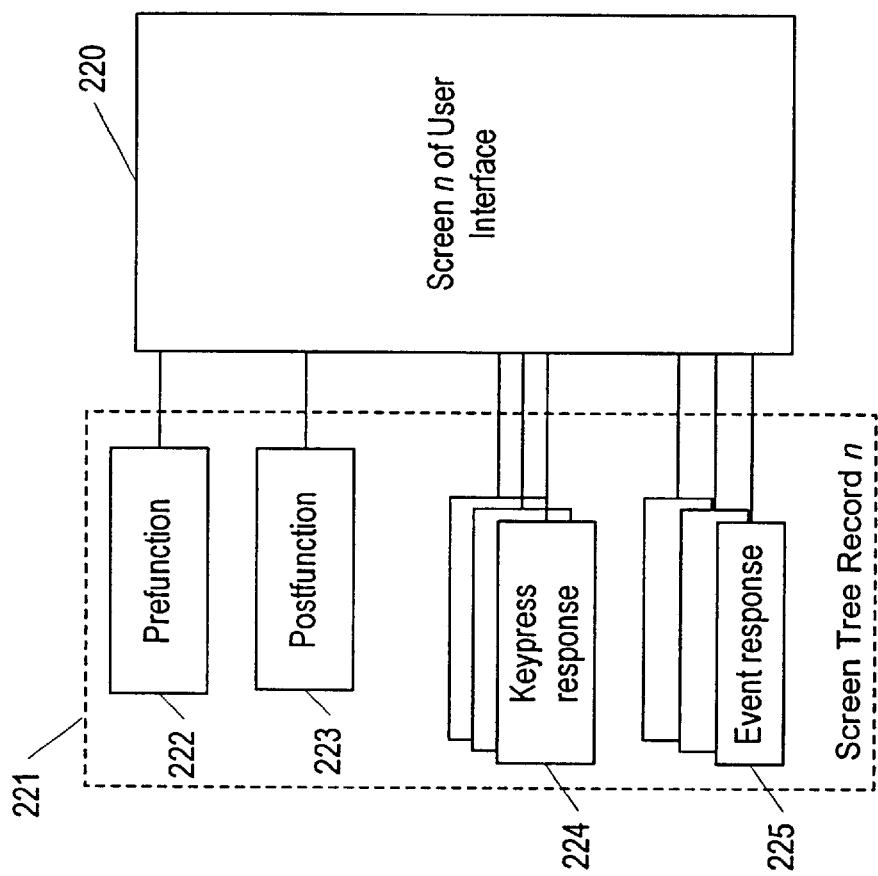
FIG. 7 is a block diagram illustrating in greater detail than in FIG. 2, the relationship of screen tree components to a user interface screen.

Referring now to FIG. 7, the association of a screen tree record 221 with a screen 220 is shown in more detail as comprising a pre-function 222 to be executed before the screen is displayed (as described above), a post-function 223 to be executed after the screen is displayed and before the pre-function for another screen is called, a keypress response 224 for one or more different keys or combination of keys, and possibly an event response 225 for one or more events or combination of events. An example of a pre function is error-checking that may be performed before displaying a next screen. An example of a post function is, when a screen-saver is being displayed is being displayed, turning on the backlight of an LCD (so that the next, non-screen-saver screen is visible).

The screen tree record data includes, in the keypress response and event response data, all preprogrammed responses for the postage meter or other mailing equipment to any keypress or event, such as the keypressing by a user entering a field value as well as the keypressing by a user either navigating about a screen, moving from one screen to another, or activating certain functions by use of special keys or combinations of keys.

Other features of the preferred embodiment include: designing a screen component with traversal information to support multiple product configurations; using checksums to validate that a screen component has not been tampered with; varying screen traversals depending on a country basis using the same embedded software.

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A user interface for a computer based apparatus, the user interface for communicating information to and receiving input from a user, the user interface comprising:

display/input system;

a data file including a font component, a screen language component and a screen tree component that together define a plurality of screens for display on the display/input system;

the font component defines a font for display on the display/input system and includes a font header providing a character size definition, a Unicode reference definition for mapping the font to a standard Unicode character set and a character bitmap definition for drawing each character of the font;

the screen language component defines a layout for each of the plurality of screens and includes fixed text and field definitions; and the screen tree component includes a screen tree directory and a plurality of screen tree records corresponding to the plurality of screens, respectively, defining function data applicable to each of the plurality of screens, respectively, and relationship information about relationships between the plurality of screens; and a control program in operative communication with the display/input system and the data file, the control program for painting the plurality of screens to the display/input system and executing functions of the computer based apparatus in response input from the user and in accordance with the data file; and wherein:

to paint a particular one of the plurality of screens on the display/input system, the control program locates the particular one screen in the screen tree directory, retrieves the function data and relationship data associated with the particular one screen, uses the associated function data to establish what functionality of the computer based apparatus is available to the user from the particular one screen, and uses the font component and the screen language component to define the layout of the particular one screen.

2. The apparatus of claim 1, wherein:

for each of the plurality of screens, the function data respectively includes a pre-function identification, a post function identification and a keypress response specification including an identification of a particular function that the computer based apparatus is to execute in response to the user invoking an associated keypress response.

3. A method of operating a computer based apparatus, the method comprising the step(s) of:

using a user interface including a display/input system to communicate information to and receive input from a user;

maintaining an external data file in a memory, the external data file including a font component, a screen language component and a screen tree component that together define a plurality of screens for display on the user interface;

the font component defines a font for display on the user interface and includes a font header providing a character size definition, a Unicode reference definition for mapping the font to a standard Unicode character set and a character bitmap definition for drawing each character of the font;

the screen language component defines a layout for each of the plurality of screens and includes fixed text and field definitions; and the screen tree component includes a screen tree directory and a plurality of screen tree records corresponding to the plurality of screens, respectively, defining function data applicable to each of the plurality of screens, respectively, and relationship information about relationships between the plurality of screens;

executing a control program in operative communication with the user interface and the external data file for painting the plurality of screens to the display/input system and executing functions of the computer based apparatus in response input from the user and in accordance with the external input data by: (i) locating a particular one screen in the screen tree directory, (ii) retrieving the function data and relationship data associated with the particular one screen, (iii) using the associated function data to establish what functionality of the computer based apparatus is available to the user from the particular one screen, (iv) using the font component and the screen language component to define the layout of the particular one screen, and painting the particular one of the plurality of screens on the display/input system.

4. The method of claim 3, wherein:

for each of the plurality of screens, the function data respectively includes a pre-function identification, a post function identification and a keypress response specification including an identification of a particular function that the computer based apparatus is to execute in response to the user invoking an associated keypress response.

* * * * *